United States Patent
Kralik et al.

(10) Patent No.: US 9,562,275 B2
(45) Date of Patent: Feb. 7, 2017

(54) METHOD FOR PRODUCING HIGHLY PURE PLATINUM POWDER, AS WELL AS PLATINUM POWDER THAT CAN BE OBTAINED ACCORDING TO SAID METHOD, AND USE THEREOF

(71) Applicant: HERAEUS PRECIOUS METALS GMBH & CO. KG, Hanau (DE)

(72) Inventors: Joachim Kralik, Hanau (DE); Martin Stettner, Altenstadt (DE); Hermann Von Eiff, Neuberg (DE); Jan Schapp, Frankfurt (DE)

(73) Assignee: HERAEUS DEUTSCHLAND GMBH & CO., KG, Hanau (DE)

( * ) Notice: Subject to any disclaimer, the term of this patent is extended or adjusted under 35 U.S.C. 154(b) by 331 days.

(21) Appl. No.: 14/196,095

(22) Filed: Mar. 4, 2014

(65) Prior Publication Data
US 2014/0255247 A1 Sep. 11, 2014

(30) Foreign Application Priority Data
Mar. 5, 2013 (DE) .................. 10 2013 203 743

(51) Int. Cl.
C22C 5/04 (2006.01)
C22B 3/00 (2006.01)
C22B 3/44 (2006.01)

(52) U.S. Cl.
CPC .............. C22B 11/04 (2013.01); C22B 3/44 (2013.01); C22C 5/04 (2013.01); Y02P 10/234 (2015.11)

(58) Field of Classification Search
None
See application file for complete search history.

(56) References Cited

U.S. PATENT DOCUMENTS

| | | | |
|---|---|---|---|
| 3,620,713 A | 11/1971 | Short | |
| 6,315,811 B1 * | 11/2001 | Stettner | C01G 55/005 205/543 |
| 7,310,480 B2 | 12/2007 | Maciocco et al. | |
| 2004/0258407 A1 | 12/2004 | Maciocco et al. | |
| 2011/0114879 A1 * | 5/2011 | Arakawa | B22F 9/30 252/182.33 |

FOREIGN PATENT DOCUMENTS

| | | |
|---|---|---|
| AT | 404 026 B | 8/2008 |
| CN | 101476044 A | 7/2009 |
| CN | 102242265 A | 11/2011 |
| CN | 102797018 A | 11/2012 |
| EP | 1 061 145 A1 | 12/2000 |
| JP | 2001-181749 | 7/2001 |
| JP | 2008-038159 * | 2/2008 |
| JP | 2012-057194 | 3/2012 |
| KR | 10-0758877 B1 | 9/2007 |

OTHER PUBLICATIONS

Zheng et al.; "Studies on Extraction of Au, Pt and Pd from anode slime of copper and nickel"; Huangjin, vol. 25, Issue 6, pp. 37-42—Abstract only.
English Translation of Notification of Reasons for Refusal (type I office action) issued Apr. 6, 2015 in corresponding Japanese Application 2014-042903.
English translation of First Office Action and Search Report from corresponding Chinese Application issued Aug. 28, 2015.
English translation of Office Action and Search Report from corresponding Taiwanese Application issued Feb. 6, 2015.
Office Action issued Jan. 30, 2015 in corresponding KR application 10-2014-0025558 and English translation.
Canadian Office Action issued Mar. 15, 2016 in corresponding application 2,843,532.
Office Action issued Mar. 13, 2015 in corresponding Canadian Application No. 2,843,532.

* cited by examiner

*Primary Examiner* — Colleen Dunn
(74) *Attorney, Agent, or Firm* — Norris McLaughlin & Marcus, P.A.

(57) ABSTRACT

A method for producing highly pure platinum on an industrial scale, as well as the use of said highly pure platinum. According to the method, a hexahalogenoplatinate is reduced to platinum in acidic conditions.

23 Claims, No Drawings

METHOD FOR PRODUCING HIGHLY PURE PLATINUM POWDER, AS WELL AS PLATINUM POWDER THAT CAN BE OBTAINED ACCORDING TO SAID METHOD, AND USE THEREOF

This application claims priority of German Patent Application No. 10 2013 203 743.0 filed Mar. 5, 2013, the entire contents of which is incorporated herein by reference.

A subject matter of the invention is a method for producing highly pure platinum on an industrial scale, as well as the use of said highly pure platinum. According to the method according to the invention, a hexahalogenoplatinate is reduced to platinum in acidic conditions. Highly pure platinum is also a subject matter of the invention.

It has long been known to produce platinum by reducing an aqueous solution of a potassium hexachloroplatinate salt. A disadvantage of said method is the fact that the platinum sludge thus obtained has to be washed free of potassium ions in multiple washing steps, which is disadvantageous not only because of the consumption of large quantities of washing water, but also due to the thus deteriorating quality of the sponge. One increasingly common requirement for the production of microelectronic components is that a platinum with a platinum content >5N (99.999% by weight Pt) is provided.

Accordingly, it is necessary to provide platinum of very high purity as starting material for the production of thermocouples or for electronics applications. Mainly for the manufacture of surface coatings for magnetic data storage, it is necessary to provide a platinum powder with a total impurities content of other metals on average of <5 ppm by weight. Especially the production of thermocouples requires highly pure platinum, since the thermal voltage is very sensitive to the presence of impurities in the platinum during a temperature measurement in a thermocouple. Potassium and iron are particularly difficult to remove. Iron is a metallic impurity that is difficult to remove and is present in many refining materials and in the production environment of a noble metal refinery.

EP 1 061 145 A1 discloses a method for producing a Pt sponge, in that an $H_2PtCl_6$ solution is reduced with hydrazine. Due to the origin of the $H_2PtCl_6$ solution, which was produced from a $K_2PtCl_6$ solution in an ion exchanger, the platinum sponge produced according to said method has a potassium content that is clearly too high. Moreover, the method disclosed in EP 1 061 145 A1 is incapable of reducing the iron content.

U.S. Pat. No. 3,620,713 discloses the production of platinum by reducing an ammoniacal platinum solution with hydrazine at alkaline conditions at a pH of 9 to 11. It is a disadvantage of this method that iron, being embedded in the platinum sponge as iron hydroxide, is separated insufficiently.

Usually, poorly soluble $K_2PtCl_6$ salt is the end-product of the ultra-purification of platinum. Repeating a sequence of dissolution and re-precipitation processes, this can be obtained at very high purity in terms of the platinum content. The pure salt is often used as starting material for producing platinum metal by reducing the platinum compound. The focus in this context is on using the platinum salt at the highest possible purity level in the reduction step, since contamination by other noble metals, in particular, can be decreased only insufficiently in the reduction step.

Known methods for purification of platinum compounds comprise the electrolytic deposition from a $H_2PtCl_6$ solution. This is done after earlier cation exchange and cathodic deposition of platinum sponge. It is a disadvantage in this context that all impurities present in the hydrochloric platinum solution, in particular noble metals, are also being deposited, as is shown in the following by means of Example 5. Another method provides for the conversion of $K_2PtCl_6$ to $(NH_4)_2PtCl_6$ and subsequent calcination of said salt at elevated temperature. One attendant disadvantage is the release of large amounts of ammonium chloride which necessitates special furnace/scrubber technology. Moreover, this method is associated with an increased risk of contamination of the platinum powder by furnace atmosphere-borne iron rust-containing dust.

Another method is based on reducing $K_2PtCl_6$ in an $H_2$ gas flow at elevated temperature. The contamination of the platinum powder by potassium chloride is a disadvantage of this method. Potassium chloride can be removed completely by washing though the effort involved is uneconomical.

Wet chemical reduction of platinum salts through suitable reducing agents is generally known.

Accordingly, U.S. Pat. No. 3,620,713 (A) discloses a hydrazine reduction in alkaline solution. However, this is disadvantageous in that traces of non-ferrous heavy metal salts still present in the solution, as well as iron, are also precipitated in the form of the hydroxide and thus contaminate the platinum sponge. From U.S. Pat. No. 3,620,713 (A), it is known to reduce a complex of platinum ammonium hydroxide.

Non-ferrous heavy metals shall be understood to be a sub-group of non-ferrous metals that does not include the noble metals. Non-ferrous heavy metals comprise metals such as cadmium (Cd), cobalt (Co), copper (Cu), nickel (Ni), lead (Pb), tin (Sn), and zinc (Zn).

The object of the present invention was to develop a method that overcomes the disadvantages of the prior art and is capable of producing a highly pure platinum, in which the content of alkali metals, in particular of potassium or sodium, is clearly lessened. It was another object to clearly decrease the content of further noble metals with the exception of platinum as matrix metal. Moreover, it should be feasible to also clearly decrease the content of the copper group metals and/or, if possible, non-ferrous heavy metals. Moreover, the method should be capable of decreasing the content of the main impurity, namely iron, preferably without requiring additional procedural steps. It as another object to identify a method that can preferably be implemented in continuous manner or in partial steps in continuous manner. Moreover, it should be feasible to implement the method on an industrial scale. It was another object to identify a method that is as economical as possible in that the afore-mentioned metals can be separated, preferably in just a small number of steps. Moreover, it should be feasible to use inexpensive compounds as educts.

The object of the invention was met according to the method of claim 1 and by the platinum that can be obtained according to the methods; preferred embodiments are illustrated in the subclaims and, in detail, in the description.

It has been found surprisingly that the reduction performed, according to the invention, in acidic conditions allows highly pure platinum sponges to be obtained despite the use of a poorly soluble platinum complex salt. This is the case, because iron salts stay in solution or in the aqueous phase if the reduction is carried out in acidic solution or suspension (pH 0-4), and do not contaminate the Pt sponge. This means also allows non-ferrous heavy metals to be separated from the platinum to be precipitated.

The use of nitrogen-containing, poorly soluble hexahalogenoplatinate, such as preferably $(NH_4)_2PtCl_6$, as starting compound for the reduction affords the additional advantage that the production of the nitrogen-containing hexahalogenoplatinate includes a further purification step through precipitation of the poorly soluble $(NH_4)_2PtCl_6$. In particular, traces of other noble metals that are still present can be separated easily from a dilute solution due to said precipitation. The direct use of $K_2PtCl_6$ or of $H_2PtCl_6$ produced from it by means of ion exchange in the hydrazine reduction usually leads to the platinum sponge having a poorer product quality, as is evident from Examples 3 and 4. The residual ammonium salts still present in the Pt sponge later on can be removed completely, as an option, after washing with water by heating the Pt sponge to glowing at 800° C.

Direct reduction of $K_2PtCl_6$ or of $H_2PtCl_6$ produced from it through ion exchange in the hydrazine reduction usually leads to the platinum sponge having a clearly poorer product quality and, in particular, more extensive contamination by potassium or generally by alkali metals, iron, noble metals with the exception of platinum and non-ferrous heavy metals. Even the content of sulphur, boron, and phosphorus can be decreased very clearly through the method according to the invention as compared to known methods. In some cases, the afore-mentioned metallic impurities cannot be washed out completely, as is evident from the reference examples Example 3 and 4 according to the method of EP 1061145A1.

The core step of the method according to the invention is the reduction of $(NH_4)_2PtCl_6$, which can proceed by electrochemical or wet chemical means. Electrochemical means can be a cathodic deposition of platinum. A preferred alternative is the reductive deposition of platinum by means of metal-free organic reducing agents that form water-soluble and heat-decomposable salts or volatile compounds. According to the invention, the core step comprises the reduction of $(NH_4)_2PtCl_6$ by hydrazine since this enables the production of a fully salt-free platinum powder. Any $NH_4Cl$ that may still be present can be removed easily by heating as is evident from Examples 1 and 2. Moreover, the method according to the invention comprises a defined combination of procedural steps, which preferably comprises further procedural steps prior to the reduction step and starts with the conversion of an aqueous hexahalogenoplatinate solution, preferably of an alkali hexahalogenoplatinate solution, more preferably a potassium hexahalogenoplatinate, an ammonium hexahalogenoplatinate or a mixture containing the two afore-mentioned hexahalogenoplatinate compounds, which is being contacted to a cation exchanger, preferably a strongly acidic cation exchanger of the sulfonic acid type. By means of said first step (i), the cations of the hexahalogenoplatinate, preferably of the alkali hexahalogenoplatinate or ammonium hexahalogenoplatinate, are exchanged for protons and the free hexahalogenoplatinum acid is thus obtained. According to the invention, potassium ions are exchanged for protons. Alternatively, ammonium ions are exchanged for protons. To a small degree, other cationic impurities can be removed in the ion exchanger process.

However, the retention in the ion exchanger is not very pronounced as is evident from Examples 3 and 4 as compared to the cleaning step according to the invention of Examples 1 and 2. A very good decrease of the metallic impurities and/or impurities comprising boron, sulphur and/or phosphorus can be obtained only in the second step (ii) of the production of the nitrogen-containing hexahalogenoplatinate and subsequent acidic reduction (step v) to the platinum sponge.

According to the invention, what is obtained is a very pure, metal ion-free aqueous hexahalogenoplatinic acid solution, which is converted into a nitrogen-containing hexahalogenoplatinate before the reduction step. Subsequently, said compound is reduced for precipitation by means of a reducing agent at a temperature T of +30° C. or higher and a pH of 0 to 4, in particular at pH 0 to 3.5, preferably 0 to 2.5. Whereby the pH value can drop even further if the acid concentration is more than one mol. However, the reducing effect is lessened if the acid concentrations are too high such that pH 0 to 4 is preferred The resulting platinum sponge does not need to be washed to be free of metal ions any more. A second particular advantage of the method according to the invention is the formation of heat-decomposable nitrogen compounds as side products, preferably of ammonium, such as ammonium chloride. The high washing water consumption of known methods can also be minimised by the method according to the invention, while the quality of the platinum sponge is increased concurrently.

It has been evident that the iron salts stay in solution and thus do not contaminate the Pt sponge if the reduction of the nitrogen-containing compound proceeds in acidic solution, in particular at pH 0 to 4. The non-ferrous heavy metals can also be separated very well due to the production of the nitrogen-containing hexahalogenoplatinate, as is evident from Examples 1 and 2.

Preferably, $(NH_4)_2PtCl_6$ is used as nitrogen-containing hexahalogenoplatinate. Likewise, $(NR_4)_2PtCl_6$ according to Formula I, where R, independent of each other, are alkyl of from 1 to 10 C atoms or hydrogen as well as di-functional residues forming an aromatic system, can be used as nitrogen-containing hexahalogenoplatinate. Preferably, methyl, ethyl and/or hydrogen-substituted compounds can be used, independent of each other, as R such as $(CH_3)NH_3^+$, $(CH_3)_2NH_2^+$ $(CH_3)_3NH^+$, $(CH_3CH_2)(CH_3)_2NH^+$, $(CH_3CH_2)_3NH^+$, $(CH_3CH_2)_2(CH_3)NH^+$, $(CH_3)_4N^+$, pyridinium according to Formula I. Halogenides, preferably chloride, are suitable as counterions. The use of $(NH_4)_2PtCl_6$ as starting compound for the reduction is particularly preferred, since no additional elements other than hydrogen and carbon are thus introduced.

The method according to the invention allows a Pt sponge of a purity of 99.999% by weight and a fraction of iron impurities of <1 ppm to be obtained. A particular advantage of the method according to the invention is the continuous production of platinum powder of a purity in excess of 99.999% by weight. The iron or potassium contamination is 1 ppm by weight or less. The platinum powders that can be obtained according to the invention therefore have a platinum content in excess of 99.999% by weight; depending on the specific procedure used, platinum can be obtained continuously in the form of platinum powder of a content in excess of 99.9995% by weight.

A subject matter of the invention is a method for producing highly pure platinum, as well as platinum that can be obtained according to said method, comprising the steps of
producing a mixture comprising a nitrogen-containing hexahalogenoplatinate, in particular hexachloroplatinate, preferably ammonium hexachloroplatinate, and water having a pH value of 0 to 4;
heating the mixture to a temperature of 30° C. or higher;
carrying out a reduction in order to precipitate platinum in the form of a platinum sponge with the pH value during the reduction advantageously being 0 to 4, in particular 0 to 3.5, preferably 2.5 to 0, more preferably 0.5 to 3.5.

A subject matter of the invention is a method for producing highly pure platinum, as well as platinum that can be obtained according to said method, comprising the steps of producing a mixture comprising a nitrogen-containing hexahalogenoplatinate, preferably ammonium hexachloroplatinate, preferably ammonium hexachloroplatinate, and water, whereby the resulting mixture has a pH value of 0 to 4;

heating the mixture to a temperature of 30° C. or higher;

adding a reducing agent in order to precipitate platinum in the form of a platinum sponge with the pH value during the reduction advantageously being 0 to 4.

According to the invention, the mixture is a suspension of a nitrogen-containing hexahalogenoplatinate and water. Preferably, the nitrogen-containing hexahalogenoplatinate has a solubility in water of 8.0 g/1,000 mL or less at 20° C., in particular a solubility of 7.0 g/1,000 mL or less at 20° C., preferably less than 6.8 g/1,000 mL at 20° C. Alternatively or in addition, the nitrogen-containing hexahalogenoplatinate should have a solubility in water of 15.0 g/100 mL or less at 100° C., in particular of 14.0 g/100 mL or less at 100° C., preferably less than 13.0 g/100 mL at 100° C. Also preferably, the nitrogen-containing hexahalogenoplatinate, in particular the hexachloroplatinate, forms, in the presence of the reducing agent, platinum as the product in the form of a platinum sponge and a heat-decomposable salt as side product, in particular a water-soluble salt. Moreover, the nitrogen-containing hexachloroplatinate preferably has a solubility in water of 8.0/1,000 mL or less at 20° C. The ammonium hexachloroplatinate used according to the invention has a solubility in water of approx. 6.7 g/1,000 mL or less at 20° C. (at RT: 18 to 25° C.), in particular a solubility of 12.5 g/100 mL or less at 100° C. $(NH_4)_2PtCl_6$ having a solubility in water of 0.67 g/100 mL or less (20° C.) is preferred. Advantageously, the nitrogen-containing hexahalogenoplatinate is precipitated from a slightly acidic solution. For example at pH 2.5 to 5. Preferably, the concentrations of platinum can be 5 to 10 g in 100 ml of solution. It is also advantageous, according to an alternative a), for additional precipitant, such as ammonium chloride, to be added for further precipitation. Moreover, b) an aldehyde-free alcohol can be added. However, measures a) and b) for precipitation are advantageously carried out only after separating the hexahalogenoplatinate precipitated earlier without said additives in order to recycle as much as possible of the platinum salt that is still in solution for a different purification. Depending on purity, the nitrogen-containing hexahalogenoplatinate precipitated through measures a) and/or b) can also be subjected to the reduction.

Moreover, it is preferred to heat the mixture to 35 to 80° C. and preferably to stir it. It is also advantageous to keep the temperature below 80° C. while adding the reducing agent. According to a particularly preferred embodiment variant, the pH value is between 0 and 4 during the reduction. After adding the reducing agent, the temperature of the resulting reaction mixture is adjusted to 85° C. or higher, preferably is adjusted to 90° C. or higher, in particular for 1 to 10 hours. This measure removes excessive reducing agent, such as hydrazine, through catalytic decomposition.

Reducing agents that can be used in the method are selected from metal-free organic reducing agents, preferably hydrazine, hydrazine-hydrate, hydrazine hydrohalogenide, whereby the halogenide advantageously corresponds to the halogenide of the hexahalogenoplatinate, such as chlorine, ascorbic acid, formic acid, and oxalic acid. Particularly preferred reducing agents are selected from hydrazine and hydrazine-hydrate.

Following the reduction and the removal of the excess of reducing agent, the platinum sponge is advantageously concentrated by decanting the supernatant aqueous solution or highly diluted suspension. The platinum sponge thus obtained is washed repeatedly with fully deionised water, in particular two to 20 times, preferably 2 to 4 times. Subsequently, the platinum sponge can be filtered and, optionally, can be washed more with fully deionised water.

According to a preferred way of implementing the method, the platinum sponge is separated and, optionally, washed. Subsequently, the platinum sponge is subjected to a thermal treatment at a temperature above approx. 350° C., preferably above 400° C. It is also preferred to subject the platinum sponge to a treatment at a temperature above 450° C., 500° C., 550° C., 650° C., 700° C., 750° C., particularly preferably at 800° C. or higher, and advantageously below the melting point of platinum. The duration of treatment can be 30 minutes to 10 hours, preferably the treatment is carried out for 1 to 3 hours, preferably for approx. 1.5 hours.

The nitrogen-containing hexahalogenoplatinate used according to the invention, in particular having a solubility in water of 8.0 g/1,000 mL or less at 20° C., advantageous of 7.0 g/1,000 mL or less at 20° C., is produced by converting a solution of a dihydrogen hexahalogenoplatinate in acidic conditions into a nitrogen-containing hexahalogenoplatinate.

It is advantageous for this purpose to mix a dihydrogen hexahalogenoplatinate, in particular a hydrochloric dihydrogen hexahalogenoplatinate solution, and an ammonium chloride solution. Preferably, the dihydrogen hexahalogenoplatinate solution is added to and mixed with an ammonium chloride solution under defined conditions. Alternatively, it is also feasible to add an ammonium chloride, in particular as ammonium chloride solution, to the dihydrogen hexahalogenoplatinate, preferably while mixing. The ammonium hexachloroplatinate thus produced precipitates as a precipitate and is advantageously filtered and optionally washed with fully deionised water. Alternatively, the precipitate can be decanted or separated in a centrifuge.

By this means, the nitrogen-containing hexahalogenoplatinate can be produced as a function of the specific nitrogen-containing halogen salt used, $R_4N^+Hal^-$, whereby R is defined as above and Hal is halogen, in particular chlorine.

Advantageously, the nitrogen-containing hexahalogenoplatinate is produced by converting a solution of a dihydrogen hexahalogenoplatinate in the presence of ammonium chloride, in particular in acidic conditions, advantageously in the presence of hydrochloric acid, into ammonium hexahalogenoplatinate, preferably into ammonium hexachloroplatinate. The dihydrogen hexachloroplatinate to be converted into ammoniumhexachloroplatinate in hydrochloric solution in the presence of ammonium chloride is particularly preferred; in particular, the ammonium hexachloroplatinate forms a precipitate. Moreover, it is preferred to use a cation that can be evaporated by heating and forms heat-decomposable salts.

According to the invention, the solution of the dihydrogen hexahalogenoplatinate is produced by contacting a hexahalogenoplatinate that is dissolved in water at a hot temperature, advantageously at 50 to 90° C., preferably at 60 to 80° C., more preferably at 65 or 70° C. each up to 75° C., in particular an alkali hexahalogenoplatinate, preferably potassium hexahalogenoplatinate, more preferably an alkali hexachloroplatinate such as potassium hexachloroplatinate, or ammonium hexahalogenoplatinate, such as ammonium hexachloroplatinate, to an acidic ion exchanger. According to a particularly preferred variant of the method, the solution of the dihydrogen hexahalogenoplatinate is produced by contacting a potassium hexahalogenoplatinate or ammonium hexahalogenoplatinate with an acidic ion exchanger. It is particularly preferable to contact potassium hexachloroplatinate with the acidic ion exchanger. Advantageously, a potassium hexahalogenoplatinate solution or an ammonium hexahalogenoplatinate solution is used as hexahalogenoplatinate solution, since said platinate is easy to isolate in preceding procedural steps. Moreover, a hexachloroplatinate solution is advantageous, because known separation methods are often carried out in hydrochloric medium and the hexachloroplatinate is the stable species in said medium.

Moreover, it is advantageous to evaporate the solution after passing it through the cation exchanger. According to the invention, a saturated aqueous solution of the dihydrogen hexahalogenoplatinate is contacted with ammonium chloride. It is generally feasible in this context to add the dihydrogen hexahalogenoplatinate solution to a solution of ammonium chloride or to add ammonium chloride as a solid or in solution to the dihydrogen hexahalogenoplatinate solution. Advantageously, the Pt content of the dihydrogen hexahalogenoplatinate solution is adjusted to approx. 30% by weight (w/w) relative to the overall composition. Advantageously, this is attained by evaporation. The subsequent conversion with ammonium chloride can then proceed essentially quantitatively. Later on, the reduction is also carried out with a defined concentration of ammonium hexachloroplatinate in the reduction mixture in order for the platinum obtained to precipitate in more compact form and to be decanted and/or filtered more easily and such that there is less washing water per kg of platinum sponge produced.

According to the method according to the invention, the dihydrogen hexahalogenoplatinate thus obtained is evaporated in a rotary evaporator at a temperature between 100 and 130° C. Said procedural step can be implemented as a continuous step.

And lastly, it proves to be advantageous to use hydrazine, hydrazine-hydrate, ascorbic acid, formic acid or oxalic acid as reducing agent, since these substance are time-proven in practical application. Likewise, hydroquinones can be used as reducing agent or activator either alone or, preferably, as activator in a composition containing one of the aforementioned reducing agents. According to the invention, a solution comprising hydrazine and hydroquinone is used. Reducing agents forming gaseous components or water-soluble salts and/or heat-decomposable salts after being oxidised are particularly preferred. However, other reducing agents like, for example, hydrogen (under pressure), sugar and formaldehyde, are conceivable just as well.

Finally, it is advantageous to carry out the reduction to platinum at a temperature of +55° C. to +95° C., advantageously at 60° C. to 75° C., in order to obtain platinum powder and to prevent mirrorlike deposition and/or massive deposition of platinum.

It is a particular advantage of the method according to the invention that at least partial steps or the entire method can be carried out in continuous manner. Moreover, the method according to the invention renders it feasible to produce 5 kg or more of highly pure platinum per day, preferably 10 kg or more of highly pure platinum per day. Highly pure platinum shall be understood to mean a 4N platinum, preferably a 5N platinum, whereby 4N or 5N refers to the contamination by metallic impurities.

Moreover, it is advantageous for the platinum sponge thus obtained to be washed, dried and heated to glowing, since said means allow the last impurities of nitrogen-containing salts, such as ammonium chloride, to be removed.

The dissolved hexahalogenoplatinate shall be understood to be a dissolved hexahalogenoplatinate salt, for example potassium or ammonium salt thereof.

A subject matter of the invention is a method for producing highly pure platinum as well as a platinum sponge that can be obtained according to said method, comprising (i) preparing a dihydrogen hexahalogenoplatinate solution by contacting a dissolved hexahalogenoplatinate to an acidic ion exchanger, advantageously an alkali hexahalogenoplatinate, in particular a potassium hexahalogenoplatinate, preferably an alkali hexachloroplatinate, particularly preferably potassium hexachloroplatinate or ammonium hexahalogenoplatinate;

(ii) producing the nitrogen-containing hexahalogenoplatinate, in particular having a solubility in water of 8.0 g/1,000 mL or less at 20° C., in particular of 8.0 g/1,000 mL or less at 20° C. (pH=2-5), preferably of 0.7 g/100 mL or less (20° C.), by converting a dihydrogen hexahalogenoplatinate solution in acidic conditions into a nitrogen-containing hexahalogenoplatinate with the dihydrogen hexahalogenoplatinate preferably being a dihydrogen hexachloroplatinate that is being converted into ammonium hexachloroplatinate in the presence of ammonium chloride, whereby the ammonium hexachloroplatinate preferably forms a precipitate;

(iii) producing a mixture comprising a nitrogen-containing hexahalogenoplatinate, advantageously a hexachloroplatinate, and water, whereby a pH value of 0 to 4 is adjusted or the resulting mixture, in particular comprising step (ii) due to particularities of the procedure, has a pH value of 0 to 4;

(iv) heating the mixture to a temperature of 30° C. or higher, in particular to 35° C. to 70° C., preferably while stirring;

(v) adding a reducing agent, preferably an aqueous hydrazine solution for (vi) precipitating platinum in the form of a platinum sponge, preferably keeping the temperature of the reaction mixture below 75° C., adjusting the pH value to 0 to 4 and maintaining it there while the reducing agent is being added, and preferably adjusting the temperature of the resulting reaction mixture to 85° C. or higher, particularly preferably to 90° C. or higher, and optionally up to 105° C. after adding the reducing agent, and advantageously adjusting the temperature of the resulting reaction mixture to 95+/−5° C. for 1 to 10 hours after adding the reducing agent;

(vii) separating the platinum sponge, optionally washing the platinum sponge with hydrochloric acid (HClaq) and fully deionised water;

(viii) subjecting the platinum sponge to a thermal treatment at a temperature above approx. 350° C., preferably at a temperature above 400° C., more preferably above 450° C., 500° C., 550° C., 650° C., 700° C., 750° C., particularly preferably at 800° C. or higher, in particular, and below the melting point of platinum.

Also a subject matter of the invention is a method for producing highly pure platinum as well as a platinum sponge that can be obtained according to said method, comprising (i) producing a dihydrogen hexachloroplatinate solution through contacting a dissolved hexahalogenoplatinate, advantageously a heat-dissolved hexahalogenoplatinate, such as potassium hexachloroplatinate, to an acidic ion exchanger;

(ii) producing the nitrogen-containing hexachloroplatinate, in particular having a solubility in water of 8.0/1,000 mL or less at 20° C., advantageously of 7.0 g/1,000 mL at 20° C. (solubility at pH=7) through converting a dihydrogen hexachloroplatinate solution in acidic conditions, advantageously in hydrochloric conditions, in the presence of ammonium chloride into ammonium hexachloroplatinate as the nitrogen-containing hexachloroplatinate, in particular with the ammonium hexachloroplatinate forming a precipitate;

(iii) producing a mixture comprising ammonium hexachloroplatinate as nitrogen-containing hexahalogenoplatinate, and water, whereby the resulting mixture has a pH value of 0 to 4;

(iv) heating the mixture to a temperature of 30° C. or higher, in particular to 35° C. to 80° C., preferably while stirring;

(v) adding a reducing agent, preferably an aqueous solution containing hydrazine, preferably an aqueous solution consisting of water and hydrazine or hydrazine hydrate, for (vi) precipitating platinum in the form of a platinum sponge (in steps v and vi) while forming a heat-decomposable salt, in particular a heat-decomposable and water-soluble salt, preferably keeping the temperature of the reaction mixture below 75° C., adjusting the pH value to 0 to 4 and preferably maintaining it in this range while the reducing agent is being added, and preferably adjusting the temperature of the resulting reaction mixture to 85° C. or higher, more preferably to 95° C.+/−5° C., optionally to 95° C. to 115° C. or higher after adding the reducing agent; advantageously adjusting the temperature of the resulting reaction mixture to 90° C. or higher for 1 to 10 hours after adding the reducing agent;

(vii) separating the platinum sponge, optionally washing of the platinum sponge;

(viii) subjecting the platinum sponge to a thermal treatment at a temperature above approx. 350° C., preferably at a temperature above 400° C., more preferably above 450° C., 500° C., 550° C., 650° C., 700° C., 750° C., particularly preferably at 800° C. or higher, in particular, and below the melting point of platinum.

Also a subject matter of the invention is an ammonium hexachloroplatinate that is produced or can be obtained according to said method comprising the procedural steps (i) and (ii) of (i) producing a dihydrogen hexachloroplatinate solution through contacting a dissolved hexahalogenoplatinate, such as potassium hexachloroplatinate or an ammonium hexachloroplatinate, to an acidic ion exchanger;

(ii) producing the ammonium hexachloroplatinate through converting a dihydrogen hexachloroplatinate solution in acidic conditions in the presence of ammonium chloride into ammonium hexachloroplatinate as the nitrogen-containing hexahalogenoplatinate, which is, in particular, isolated as a precipitate. It is advantageous to decant and/or filter the mother liquor; optionally, it can dry at least partly or is dried at least partly. The ammonium hexachloroplatinate thus obtained is particularly well-suited for implementing the method according to the invention. Advantageously, it was feasible to clearly decrease the content of iron and other noble metals, in particular of the platinum group metals with the exception of the platinum matrix metal by means of this procedural step. The metals mentioned above remain in the mother liquor due to procedural step (ii).

Another subject matter of the invention is a method for producing a highly pure platinum sponge as well as a platinum sponge that can be obtained according to said method comprising (i.1) dissolving $K_2PtCl_6$ in hot, fully deionised water (German: vollentsalztes Wasser, VEW) and passing it over a cation exchanger, (i.2) optionally evaporating the $H_2PtCl_6$ solution thus obtained in a rotary evaporator at up to 130° C., (i.3) taking a sample of said $H_2PtCl_6$ solution for analysis of purity by means of ICP, (ii.1) adding fully deionised water and hydrochloric acid to said solution, (ii.2) slowly adding doses of said Pt salt solution at 20° C. under vigorous stirring to an ammonium chloride solution, or alternatively adding the ammonium chloride solution to the Pt salt solution. Advantageously, the ammonium chloride solution can be an approx. (fully deionised water) 10 to 20% by weight aqueous ammonium chloride solution, advantageously approx. 14 to 16% by weight. Optionally, stirring is continued, in particular for approx. 10 to 150 minutes, preferably for 90 min., (ii.3) once the $(NH_4)_2PtCl_6$ salt has sedimented, said salt is (ii.4) separated, advantageously filtered, and optionally dried, (iii.1) wet $(NH_4)_2PtCl_6$ salt and fully deionised water are placed together and a suspension is prepared, in particular at a ratio of approx. 1:5 to 1:20, preferably 1:10 to 1:14, (iv) the suspension is stirred and heated to 60° C. or higher, in particular to 65° C., (v.1) at pH 0 to 4, in particular 2 to 3.5, hydrazine solution is added for a defined period of time, preferably a solution consisting of water and hydrazine or hydrazine-hydrate, in particular hydrazine is added at a molar ratio of $(NH_4)_2PtCl_6$ to hydrazine of 1 to 4, in particular 1:1.5; advantageously, an excess of hydrazine is added, but at least a molar ratio of approx 1:1.1; preferably keeping the pH value at 0 to 4, more preferably at pH 0 to 3.5, with the addition advantageously proceeding over the course of 4 hours and/or the dosing being done at a dosing rate of 0.05 to 0.6 l/min, advantageously at 0.1 to 0.2 l/min, (v.2) boiling off excessive hydrazine after the addition of the reducing agent for a defined period of time at a temperature of 90° C. or higher, advantageously at approx. 95° C., (vi) precipitating the platinum sponge in step (v.1 and, optionally, v.2 and/or vi), (vii.1) decanting the mother liquor in order to separate the platinum sponge, and washing the Pt sponge optionally one or more times first with hydrochloric acid, then with fully deionised water, (vii.2) optionally, suctioning the Pt sponge through a suction filter and washing it to be free of chloride with hot fully deionised water, (viii) subsequently subjecting the platinum sponge to a thermal treatment for 15 minutes to 10 hours at approx. 800° C., advantageously for 1 to 3 hours, preferably for approx. 1.5 h. In general, it is also conceivable to add hydrazine at a molar ratio of $(NH_4)_2PtCl_6$ to hydrazine of up to 1 to 10 including all values in between. However, excessive hydrazine contents are undesirable, since they need to be removed again.

Advantageously, the separation in step (ii.4) is effected by decanting as much as possible of the supernatant mother liquor off the $(NH_4)_2PtCl_6$ salt and then preferably washing the salt with an aqueous ammonium chloride solution or fully deionised water and ammonium chloride.

It is advantageous in the method according to the invention to use essentially pure, i.e. p.a.-grade chemicals or highly pure chemicals and fully deionised water (German: vollentsalztes Wasser, VEW). It is preferable to use chemicals, such as aqueous hydrochloric acid (chem. pure) or ammonium chloride (p.a.) of a purity of at least 99.95% by weight, particularly preferably of 99.98% by weight or higher or advantageously of 99.99% by weight or higher. The purity of the fully deionised water usually is 99.9999% by weight or higher in terms of metallic impurities.

Also a subject matter of the invention is a platinum that can be obtained according to the method according to the invention and has a total alkali metal content of 0.1 μg/g platinum or less, in particular of 0.05 μg/g platinum or less. Also a subject matter of the invention is a platinum that can be obtained according to the method according to the invention and has a total iron content of 1 µg/g platinum or less. Advantageously, the platinum that can be obtained has a total alkali metal content of 0.1 µg/g platinum or less, in particular of 0.05 µg/g platinum or less and an iron content of 1 µg/g platinum or less. Preferably, the sum of the potassium and iron impurities is less than 1 µg/g. Advantageously, the platinum is present in the form of platinum sponge. Another subject matter of the invention is a platinum obtainable by a method according to the invention which has a total content of foreign metals other than the platinum matrix metal of 5 ppm by weight or less.

Also a subject matter of the invention is a platinum that can be obtained according to said method and has a purity of at least 99.999% by weight (5 N, five nines) and has a content of platinum group elements other than platinum (Rh, Ru, Ir, Os, Pd) of 1.0 µg/g platinum or less.

Also a subject matter of the invention is a platinum that can be obtained according to said method and has a content of platinum group metals other than the platinum matrix metal of 1.0 µg/g platinum or less, preferably of 0.75 µg/g platinum or less, whereby it is particularly preferable that the contents of the platinum group elements Pd, Rh, Ru, Ir, and Os are decreased by a factor of 10 to 1,000 by the method according to the invention as compared to the content of the platinum group elements Pd, Rh, Ru, Ir, and Os in the hexahalogenoplatinate, in particular the hexahalogenoplatinate that is being contacted to the acidic cation exchanger, which is preferably present in the form of potassium hexachloroplatinate or ammonium hexahalogenoplatinate and advantageously is the product of a a standard ultra-purification. The osmium content can be decreased by the method according to the invention by a factor of 1,000 to less than 0.001 µg osmium/g platinum.

In addition or alternatively, the contents of impurities made up by metals of the copper group, group 11 (CAS group IB), such as Cu, Ag, Au, can be decreased by the method according to the invention to a total of 0.6 µg/g platinum or less, in particular of 0.5 µg/g platinum or less, particularly preferably of 0.4 µg/g platinum or less such that a platinum having said afore-mentioned contents of metals of the copper group is a subject matter of the invention.

In addition or alternatively, the contents of impurities made up by elements of the boron group, group 13 (CAS group IIIA), such as B, Al, can be decreased by the method according to the invention to a total of 0.2 µg/g platinum or less, in particular aluminium 0.15 µg/g or less and boron 0.01 µg/g or less such that a platinum having said afore-mentioned contents of elements of the boron group is a subject matter of the invention.

In addition or alternatively, the contents of impurities made up by the elements phosphorus and/or sulphur can be decreased by the method according to the invention to a total of 0.2 µg/g platinum or less, preferably of 0.15 µg/g or less, in particular phosphorus 0.05 µg/g and sulphur 0.1 µg/g or less such that a platinum having said afore-mentioned contents of the elements, phosphorus and sulphur, is a subject matter of the invention.

In addition or alternatively, the contents of impurities made up by the alkaline earth metals can be decreased by the method according to the invention to a total of 0.1 µg/g platinum or less, preferably of 0.075 µg/g or less, in particular calcium 0.1 µg/g or less, magnesium and barium together 0.001 µg/g or less such that a platinum having said afore-mentioned alkaline earth metal contents is a subject matter of the invention.

In addition or alternatively, the content of silicon impurities can be decreased by the method according to the invention to a total of 1.0 µg/g platinum or less, preferably of 0.9 µg/g platinum or less. In addition or alternatively, the content of arsenic impurities can be decreased by the method according to the invention to a total of 0.5 µg/g platinum or less, preferably of 0.4 µg/g platinum or less.

In addition or alternatively, the contents of impurities made up by non-ferrous heavy metals, such as cadmium (Cd), cobalt (Co), copper (Cu), nickel (Ni), lead (Pb), tin (Sn), and zinc (Zn), can be decreased by the method according to the invention to a total of 0.3 µg/g platinum or less, preferably of 0.2 µg/g platinum or less, more preferably of <0.17 µg/g platinum; particularly preferably the content of cadmium and cobalt impurities is decreased to 0.01 µg/g or less. Since the cadmium content can be reduced to <0.001 µg/g platinum, a platinum having said afore-mentioned non-ferrous heavy metal contents is a subject matter of the invention. According to the invention, non-ferrous heavy metals are selected from the metals, cadmium (Cd), cobalt (Co), copper (Cu), nickel (Ni), lead (Pb), tin (Sn), and zinc (Zn).

According to another refinement of the invention, a subject matter of the invention is the use of a highly pure platinum obtained according to the method according to the invention or of the highly pure platinum according to the invention in micro-electronics, for producing components in micro-electronics, of thermocouples, of jewelry, of platinum coatings, of platinum wires, of catalysts, for the production of and in resistance thermometers, of cardiac pacemakers, of implants, platinum-containing paints, platinum-containing pastes, platinum-containing polishing pastes, platinum-containing pastes for use in electronic components, platinum-containing pastes for use in electronic components in automobiles, of electrodes, for the production of electrically-conductive printing inks, of sliding contacts and/or alloys. In particular, the highly pure platinum is well-suited for the production of components and platinum coatings in micro-electronics, and of thermocouples.

The invention is illustrated in more detail through the examples presented in the following, though without limiting the scope of the invention.

Description of the Analytical Methods:

GD-MS measurement according to ISO/TS 15338, first edition 2009-04-01 including the following modifications for platinum:

GD-MS device: ElementGD made by ThermoFisher Scientific

Sample preparation: Pressing into an Al cup, 30 s/23 t, measured as a flat sample Plasma conditions: I=32 mA, g=380 sccm Ar res. U=800 V, crater diameter: 8 mm RSF: STANDARD set of the device manufacturer ICP analyses: ICP-OES spectrometer: iCAP 6500 DUO (axial/radial alignment) made by Thermo; Pt pre-measurement (determination of platinum matrix concentration); the sample is diluted 1:5,000 for the Pr pre-measurement: first dilution 1:50 with ultra-pure water; 1 ml of this diluted solution is used to prepare the 2nd dilution of 1:100 with 10 g Cu/NaN buffer solution, 10 ml hydrochloric acid p.a., and topped up to 100 ml with ultra-pure water. Subsequently, calibration and pre-measurement are done.

Determination of Purity

The amount needed according to the pre-measurement was weighed in a 50 ml graduated flask (rel. ±3% by weight). Then, 20 ml HCl Suprapur and 5 ml HNO$_3$ Suprapur were added and the flask topped up with ultra-pure water. Duplicate measurements were done in each case.

The platinum sponge and/or platinum powder obtained according to the invention has a purity that is clearly below the detection limit of glow discharge spectrometry (GD-OES) such that only the reference examples were analysed by GD-OES. GD-OES analyses (reference examples): ARL-3580, Horiba GD-Profiler HR, sample diameter 22 to 100 mm, sample thickness 2 to 40 mm, sample quantity 10 g or more, sample surface planar, ground

EXAMPLE 1

Quantities used: 71.489 kg $K_2PtCl_6$, (28452 g Pt), cation exchanger Amberjet® 1500H, 9 l hydrochloric acid (chem. pure, 37% by weight), 18.9 kg ammonium chloride, 30.5 l Levoxin® 22 (aqueous $N_4H_2.H_2O$ solution containing 22% by weight $N_4H_2$, commercially available from Lanxess), fully deionised water (VEW, vollentsalztes Wasser)

Procedure: $K_2PtCl_6$ was dissolved in hot fully deionised water at 70° C. and passed over the cation exchanger. The $H_2PtCl_6$ solution thus obtained was then evaporated at up to 130° C. in a rotary evaporator.

A sample of the $H_2PtCl_6$ solution was collected for analysis of purity by means of ICP. In a vessel, 9 l hydrochloric acid were added to this solution and the vessel was filled up to 200 l with fully deionised water. This Pt salt solution was then stirred vigorously at 20° C. and slowly pumped into an ammonium chloride solution (18.9 kg $NH_4Cl$, dissolved in 100 l fully deionised water) and kept stirring for another 90 min. After sedimentation of the $(NH_4)_2PtCl_6$ salt, the salt was filtered through a suction filter and suctioned further to dryness. 66.6 kg $(NH_4)_2PtCl_6$ salt (wet) and 800 l fully deionised water were placed in the vessel. The suspension was stirred and heated to 65° C. At pH 2.7, a total of 30.5 l Levoxin solution was added at a dosing rate of 0.115 l/min over a period of 4 hours. The temperature increased to 74° C. during this process. Subsequently, excessive hydrazine was boiled off for 3 hours at 95° C. The mother liquor was decanted and the Pt sponge was washed twice with 500 l fully deionised water each. Subsequently, the Pt sponge was suctioned through a suction filter and washed to be free of chlorine using 500 l of hot fully deionised water. The sponge was heated to glowing for 1.5 h at 800° C. Yield: 26.690 g Pt sponge The iron salts stay in solution if the reduction is carried out in acidic solution (pH 0-4) and do not lead to contamination of the Pt sponge. The use of $(NH_4)_2PtCl_6$ as starting compound for the reduction is associated with an additional advantage in that the production thereof includes a further purification step in the form of the precipitation of the poorly soluble $(NH_4)_2PtCl_6$. In particular, traces of other noble metals that are still present can be separated easily from a dilute solution due to said precipitation. The direct use of $K_2PtCl_6$ or of $H_2PtCl_6$, which is produced from it by means of ion exchange, in the hydrazine reduction usually leads to the platinum sponge having a poorer product quality and, in particular, higher fractions of (potassium) impurities that can sometimes not be washed out completely (Examples 3 and 4). Residual ammonium salt still present in the Pt sponge can be removed completely by heating the sponge to glowing at 800° C.

Analysis of the purity of the $H_2PtCl_6$ solution (ICP), (µg/g Pt):

| | | |
|---|---|---|
| A | <5 | pp |
| A | <3 | pp |
| P | <2 | pp |
| Ir | <10 | pp |
| R | 6 | pp |
| R | <2 | pp |
| O | <15 | pp |
| R | <10 | pp |
| Al | <5 | pp |
| A | <10 | pp |
| B | <1 | pp |
| B | <1 | pp |
| Bi | <5 | pp |
| C | <1 | pp |
| C | <5 | pp |
| C | <2 | pp |
| C | <3 | pp |
| Cr | 3 | ppm |
| Cu | <2 | ppm |
| Fe | 12 | ppm |
| Ga | <5 | ppm |
| Hg | <5 | ppm |
| K | 23 | ppm |
| Mg | <5 | ppm |
| Mn | <5 | ppm |
| Mo | <5 | ppm |
| Na | 5 | ppm |
| Nb | <20 | ppm |
| Ni | <2 | ppm |
| P | <10 | ppm |
| S | 82 | ppm |
| Pb | <5 | ppm |
| Sb | <10 | ppm |
| Se | <10 | ppm |
| Si | <10 | ppm |
| Sm | <3 | ppm |
| Sn | <5 | ppm |
| Ta | <50 | ppm |
| Te | <10 | ppm |
| Ti | <5 | ppm |
| V | <5 | ppm |
| W | <5 | ppm |
| Y | <5 | ppm |
| Zn | <5 | ppm |
| Zr | <5 | ppm |

Analysis of the purity of the Pt sponge (GDMS), (µg/g Pt):

| | | | | | | | |
|---|---|---|---|---|---|---|---|
| Ag | 0.03 | Mo | 0.001 | Fe | 0.8 | Si | 0.4 |
| Al | 0.1 | Na | 0.009 | Ga | <0.0003 | Sn | 0.007 |
| As | 0.1 | Nb | 0.0004 | Ge | <0.001 | Sr | 0.0002 |
| Au | 0.3 | Ni | 0.008 | Hf | 0.01 | Ta | 0.005 |
| B | 0.001 | Os | <0.001 | Hg | <0.001 | Te | 0.002 |
| Ba | <0.0004 | P | 0.01 | In | 0.0004 | Th | 0.0001 |
| Be | 0.0004 | Pb | 0.07 | Ir | 0.03 | Ti | 0.008 |
| Bi | 0.04 | Pd | 0.1 | K | 0.02 | Tl | 0.0003 |
| Ca | 0.06 | Pt | Matrix | Li | 0.0006 | U | <0.0004 |
| Cd | 0.0008 | Rh | 0.4 | Mg | 0.008 | V | 0.0006 |
| Co | 0.008 | Ru | 0.01 | Mn | 0.003 | W | 0.006 |
| Cr | 0.009 | S | 0.09 | | | Zn | 005 |
| Cs | <0.0001 | Sb | 0.2 | | | Zr | 0.6 |
| Cu | 0.01 | Se | 0.06 | | | | |

EXAMPLE 2

Procedure analogous to Example 1 using the following quantities: Quantities used: 126.917 kg $K_2PtCl_6$, (wet), cation exchanger Amberjet® 1500H, 14 l hydrochloric acid (chem. pure, 37%), 31.0 kg ammonium chloride, 56 l Levoxin® (22%), fully deionised water ICP Analysis H2[PtCl6] Solution:

| | |
|---|---|
| Au | <5 ppm |
| Ag | <3 ppm |
| Pd | <2 ppm |
| Ir | <10 ppm |
| Rh | 4 ppm |
| Ru | <2 ppm |
| Os | <13 ppm |
| Re | <10 ppm |
| Al | <5 ppm |
| An | <10 ppm |
| B | 1 ppm |
| Ba | <1 ppm |
| Bi | <5 ppm |
| Ca | 2 ppm |
| Cd | <5 ppm |
| Ce | <2 ppm |
| Co | <B ppm |
| Cr | <1 ppm |
| Cu | <2 ppm |
| Fe | 4 ppm |
| Ga | <5 ppm |
| Hg | <5 ppm |
| K | 4 ppm |
| Mg | <5 ppm |
| Mn | <5 ppm |
| Mo | <5 ppm |
| Na | 7 ppm |
| Nb | <20 ppm |
| Ni | <2 ppm |
| P | <10 ppm |
| S | 132 ppm |
| Pb | <5 ppm |
| Sb | <10 ppm |
| Se | <10 ppm |
| Si | <10 ppm |
| Sm | <2 ppm |
| Sn | <5 ppm |
| Ta | <50 ppm |
| Te | <10 ppm |
| Ti | <5 ppm |
| V | <5 ppm |
| W | <5 ppm |
| Y | <5 ppm |
| Zn | <5 ppm |
| Zr | <5 ppm |

Analysis of the purity of the Pt sponge (GDMS), (μg/g Pt):

| | |
|---|---|
| Ag | 0.03 |
| Al | 0.04 |
| As | 0.2 |
| Au | 0.2 |
| B | 0.001 |
| Ba | <0.0002 |
| Be | 0.0006 |
| Bi | 0.009 |
| Ca | 0.03 |
| Cd | 0.0006 |
| Co | 0.003 |
| Cr | 0.02 |
| Cs | <0.0002 |
| Cu | 0.04 |
| Fe | 0.5 |
| Ga | 0.0008 |
| Ge | 0.0009 |
| Hf | 0.01 |
| Hg | <0.004 |
| In | 0.003 |
| Ir | 0.03 |
| K | 0.05 |
| Li | 0.0004 |
| Mg | 0.005 |
| Mn | 0.005 |
| Mo | 0.001 |
| Na | 0.05 |
| Nb | 0.001 |
| Ni | 0.008 |
| Os | 0.001 |
| P | 0.006 |
| Pb | 0.03 |
| Pd | 0.05 |
| Pt | Matrix |
| Rh | 0.4 |
| Ru | 0.01 |
| S | 0.04 |
| Sb | 0.02 |
| Se | 0.05 |
| Si | 0.8 |
| Sn | 0.01 |
| Sr | 0.0006 |
| Ta | 0.009 |
| Te | 0.002 |
| Th | 0.0003 |
| Ti | 0.01 |
| Tl | 0.0003 |
| U | 0.0004 |
| V | 0.0005 |
| W | 0.002 |
| Zn | 0.04 |
| Zr | 0.4 |

EXAMPLE 3

(According to EP 1061145) for Comparison

Quantities used: 77.232 kg $K_2PtCl_6$ dry, cation exchanger Amberjet® 1500H, 35 l Levoxin® (22%) (hydrazine, hydroquinone activator), fully deionised water Procedure: $K_2PtCl_6$ was dissolved in 3,700 l of hot fully deionised water at 70° C. and passed over the cation exchanger. The $H_2PtCl_6$ solution thus obtained was then concentrated by evaporation to 800 l in a rotary evaporator. 800 l $H_2PtCl_6$ solution were placed in the vessel and the solution was heated to 70° C. under stirring. A total of 35 l Levoxin solution were added over a period of 4 hours. Subsequently, excessive hydrazine was boiled off for 1 hour at 95° C. After cooling to 30° C., the mother liquor was decanted and the Pt sponge was washed twice with 300 l fully deionised water each. Subsequently, the Pt sponge was suctioned through a suction filter and washed to be free of chlorine using 600 l of hot fully deionised water. The sponge was heated to glowing for 2 h at 900° C. Yield: 30.063 g Pt sponge Analysis of the purity of the $K_2PtCl_6$ salt (ICP), (μg/g Pt):

| | | | |
|---|---|---|---|
| Ag | <3 | Pd | 6 |
| Au | <5 | Ir | <10 |
| Rh | <3 | Ru | <2 |
| Os | <15 | Re | <10 |
| Al | <5 | As | <10 |
| B | <1 | Ba | <1 |
| Bi | <5 | Ca | <1 |
| Cd | <5 | Ce | <2 |
| Co | <3 | Cr | <1 |
| Cu | <2 | Fe | 4 |
| Mg | <5 | Mn | <5 |
| Mo | <5 | Nb | <3 |
| Ni | <2 | P | <15 |
| Pb | <5 | Sb | <5 |
| Si | <10 | Sn | <5 |
| Ta | <20 | Te | <10 |

-continued

| | | | |
|---|---|---|---|
| Ti | <5 | V | <5 |
| W | <5 | Y | <5 |
| Zn | <5 | Zr | <5 |

Analysis of the purity of the Pt sponge (GD-OES), (µg/g Pt):

| | | | |
|---|---|---|---|
| Ag | 3 | Pd | 2 |
| Au | 5 | Ir | <10 |
| Rh | <3 | Ru | <2 |
| Os | <15 | Re | <10 |
| Al | <5 | As | <10 |
| B | <1 | Ba | <1 |
| Bi | <5 | Ca | <1 |
| Cd | <5 | Ce | <20 |
| Co | <3 | Cr | <1 |
| Cu | <2 | Fe | 4 |
| Mg | <5 | Mn | <5 |
| Mo | <5 | Sb | <10 |
| Ni | <2 | Sn | <5 |
| Pb | <5 | V | <5 |
| Si | <10 | Y | <5 |
| Ta | <50 | Zr | <5 |
| Ti | <5 | | |
| W | <5 | | |
| Zn | <5 | | |

EXAMPLE 4

(According to EP 1061145) for Comparison

Quantities used: 52.622 kg $K_2PtCl_6$ wet, cation exchanger Amberjet® 1500H, 22 l Levoxin® (22%) fully deionised water Procedure: $K_2PtCl_6$ salt was dissolved in 2,400 l of hot fully deionised water at 70° C. and passed over a cation exchanger. The $H_2PtCl_6$ solution thus obtained was then concentrated by evaporation to 800 l in a rotary evaporator. 800 l $H_2PtCl_6$ solution were placed in the vessel and the solution was heated to 70° C. under stirring. A total of 22 l Levoxin solution were added over a period of 4 hours. Subsequently, excessive hydrazine was evaporated by heating for 2 hours at 95° C. After cooling to 30° C., the mother liquor was decanted and the Pt sponge was washed twice with 300 l fully deionised water each. Subsequently, the Pt sponge was suctioned through a suction filter and washed to be free of chlorine using 1000 l of hot fully deionised water. The sponge was heated to glowing for 3 h at 900° C. Yield: 19.656 g Pt sponge.

Analysis of the purity of the $K_2PtCl_6$ salt (ICP), (µg/g Pt):

| | | | |
|---|---|---|---|
| Ag | <3 | Pd | 6 |
| Au | <5 | Ir | <10 |
| Rh | <3 | Ru | <2 |
| Os | <15 | Re | <10 |
| Al | <5 | As | <10 |
| B | <1 | Ba | <1 |
| Bi | <5 | Ca | <1 |
| Cd | <5 | Ce | <2 |
| Co | <3 | Cr | <1 |
| Cu | <2 | Fe | 12 |
| Mg | <5 | Mn | <5 |
| Mo | <5 | Nb | <3 |
| Ni | <2 | P | <15 |
| Pb | <5 | Sb | <5 |
| Si | <10 | Sn | <5 |
| Ta | <20 | Te | <10 |
| Ti | <5 | V | <5 |
| W | <5 | Y | <5 |
| Zn | <5 | Zr | <5 |

Analysis of the purity of the Pt sponge (GD-OES), (µg/g Pt):

| | | | |
|---|---|---|---|
| Ag | 3 | Pd | 2 |
| Au | 6 | Ir | <10 |
| Rh | 3 | Ru | 10 |
| Os | <15 | Re | <10 |
| Al | 7 | As | <10 |
| B | <1 | Ba | <1 |
| Bi | <5 | Ca | <1 |
| Cd | <5 | Ce | <20 |
| Co | <3 | Cr | 1 |
| Cu | 3 | Fe | 9 |
| Mg | <5 | Mn | <5 |
| Mo | <5 | Sb | <10 |
| Ni | <2 | Sn | <5 |
| Pb | <5 | V | <5 |
| Si | <10 | Y | <5 |
| Ta | <50 | Zn | <5 |
| Ti | <5 | Zr | <5 |
| W | <5 | | |

EXAMPLE 5

(Electrolysis) for Comparison

Quantities used: 165.123 kg $K_2PtCl_6$ wet, cation exchanger Amberjet® 1500H, fully deionised water Procedure: $K_2PtCl_6$ salt was dissolved in 7,400 l of hot fully deionised water and passed over a cation exchanger. The $H_2PtCl_6$ solution was pumped continuously into the electrolysis cell and Pt powder was deposited by electrolysis at an operating temperature of approx. 50° C. Subsequently, the Pt powder was suctioned through a suction filter and washed to be free of chlorine using 1,200 l of hot fully deionised water. The powder was heated to glowing for 3 h at 900° C. Yield: 60.525 g Pt powder Analysis of the purity of the $K_2PtCl_6$ salt (ICP), (µg/g Pt):

| | | | |
|---|---|---|---|
| Ag | <3 | Pd | 2 |
| Au | <5 | Ir | <10 |
| Rh | 16 | Ru | 3 |
| Os | <15 | Re | <10 |
| Al | <5 | As | <10 |
| B | 1 | Ba | <1 |
| Bi | <5 | Ca | <1 |
| Cd | <5 | Ce | <2 |
| Co | <3 | Cr | 1 |
| Cu | 2 | Fe | 5 |
| Mg | <5 | Mn | <5 |
| Mo | <5 | Nb | <3 |
| Ni | <2 | P | <15 |
| Pb | <5 | Sb | <5 |
| Si | <10 | Sn | <5 |
| Ta | <20 | Te | <10 |
| Ti | <5 | V | <5 |
| W | <5 | Y | <5 |
| Zn | <5 | Zr | <5 |

Analysis of the purity of the Pt sponge (GD-OES), (µg/g Pt):

| | | | |
|---|---|---|---|
| Ag | <3 | Pd | <2 |
| Au | <5 | Ir | <10 |

-continued

| | | | |
|---|---|---|---|
| Rh | 16 | Ru | <2 |
| Os | <15 | Re | <10 |
| Al | <5 | As | <10 |
| B | <1 | Ba | <1 |
| Bi | <5 | Ca | <1 |
| Cd | <5 | Ce | <20 |
| Co | <3 | Cr | <1 |
| Cu | <2 | Fe | 3 |
| Mg | <5 | Mn | <5 |
| Mo | <5 | Nb | <20 |
| Ni | <2 | P | <10 |
| Pb | <5 | Sb | <10 |
| Si | <10 | Sn | <5 |
| Ta | <50 | Te | <5 |
| Ti | <5 | V | <5 |
| W | <5 | Y | <5 |
| Zn | <5 | Zr | <5 |

EXAMPLE 6

Quantities used: 140,469 kg $K_2PtCl_6$ wet, (50,875 g Pt), cation exchanger Amberjet® 1500H, 30 l hydrochloric acid (chem. pure, 37%), 70 kg ammonium chloride, 70 l Levoxin® (22%), fully deionised water)

Procedure: $K_2PtCl_6$ was dissolved in hot fully deionised water at 70° C. and passed over the cation exchanger. The $H_2PtCl_6$ solution thus obtained was concentrated by evaporation in a rotary evaporator at up to 130° C. and then filtered into a clean transport container.

A total of 70 kg ammonium chloride p.a. were dissolved in 360 l fully deionised water and 30 l hydrochloric acid chem. pure were added. After heating the solution to 65±5° C., the $H_2PtCl_6$ solution obtained above was added at a rate of 40 l/h and stirring was continued for another 90 min. After sedimentation of the $(NH_4)_2PtCl_6$ salt, the supernatant mother liquor was decanted as best as possible. A total of 20 kg ammonium chloride p. a. and 300 l fully deionised water were added to the precipitate, the precipitate was washed while stirring and decanted again after it had sedimented. A total of 800 l fully deionised water were added to the $(NH_4)_2PtCl_6$ precipitate and heated to 60° C.±5.70 l Levoxin solution were added at a dosing rate of 0.1 l/min. Subsequently, excessive hydrazine was boiled off for 3 hours at 95° C. The mother liquor was decanted and the Pt sponge washed once with 300 l fully deionised water+50 l hydrochloric acid chem. pure at 60° C. After decanting followed another washing step with 500 l fully deionised water in the vessel. Subsequently, the Pt sponge was suctioned through a suction filter and aliquots were washed to be free of chlorine using 700 l of hot fully deionised water. The sponge was heated to glowing for 1.5 h at 800° C. Yield: 50.598 g Pt sponge Analysis of the purity of the $K_2PtCl_6$ salt (ICP), (µg/g Pt):

| | | | |
|---|---|---|---|
| Ag | <3 | Pd | <2 |
| Au | 30 | Ir | <10 |
| Rh | 4 | Ru | <2 |
| Os | <15 | Re | <10 |
| Al | <5 | As | <10 |
| B | 5 | Ba | <1 |
| Bi | <5 | Ca | 3 |
| Cd | <5 | Ce | <2 |
| Co | <3 | Cr | <1 |
| Cu | <2 | Fe | <3 |
| Mg | <5 | Mn | <5 |
| Mo | <5 | Nb | <3 |
| Ni | <2 | P | <15 |
| Pb | <5 | Sb | <5 |
| Si | 12 | Sn | 7 |
| Ta | <20 | Te | <10 |
| Ti | <5 | V | <5 |
| W | <5 | Y | <5 |
| Zn | <5 | Zr | <5 |

Analysis of the purity of the Pt sponge (GDMS), (µg/g Pt):

| | |
|---|---|
| Ag | 0.02 |
| Al | 0.04 |
| As | 0.08 |
| Au | 1.2 |
| B | 0.002 |
| Ba | 0.005 |
| Be | <0.001 |
| Bi | 0.01 |
| Ca | 0.08 |
| Cd | 0.003 |
| Co | 0.0009 |
| Cr | 0.004 |
| Cs | 0.0001 |
| Cu | 0.01 |
| Fe | 0.3 |
| Ga | 0.0004 |
| Ge | <0.01 |
| Hf | <0.001 |
| Hg | 0.005 |
| In | 0.001 |
| Ir | 0.09 |
| K | 0.1 |
| Li | 0.0007 |
| Mg | 0.003 |
| Mn | 0.002 |
| Mo | 0.001 |
| Na | 0.02 |
| Nb | 0.0002 |
| Ni | 0.006 |
| Os | 0.002 |
| P | 0.005 |
| Pb | 0.06 |
| Pd | 1.4 |
| Pt | Matrix |
| Rh | 0.5 |
| Ru | 0.1 |
| S | 0.1 |
| Sb | 0.03 |
| Se | 0.003 |
| Si | 0.6 |
| Sn | 0.05 |
| Sr | 0.001 |
| Ta | 0.005 |
| Te | 0.007 |
| Th | 0.0001 |
| Ti | 0.005 |
| Tl | 0.001 |
| U | 0.0002 |
| V | 0.0003 |
| W | 0.004 |
| Zn | 0.02 |
| Zr | 0.03 |

The invention claimed is:

1. Method for producing highly pure platinum, comprising:
   producing a mixture comprising a nitrogen-containing hexahalogenoplatinate and water having a pH value of 0 to 4;
   heating the mixture to a temperature of 30° C. or higher;
   carrying out a reduction of the mixture at a pH value during the reduction of 0 to 4 in order to precipitate platinum in the form of a platinum sponge.

2. Method according to claim 1, further comprising:
producing the mixture comprising a nitrogen-containing hexahalogenoplatinate and water by a process comprising adjusting the pH of a precursor of said mixture to a pH value to 0 to 4;
heating the mixture to a temperature of 30° C. or higher;
adding a reduction agent to the mixture in order to precipitate platinum in the form of a platinum sponge.

3. Method according to claim 1, wherein
the hexahalogenoplatinate has a solubility in water of 8 g/1,000 mL or less at 20° C.

4. Method according to claim 1, wherein the hexahalogenoplatinate is a hexachloroplatinate.

5. Method according to claim 1, wherein the nitrogen-containing hexahalogenoplatinate forms, in the presence of a reducing agent, platinum in the form of a platinum sponge and a heat-decomposable salt and/or water-soluble salt as side product.

6. Method according to claim 1, wherein the hexahalogenoplatinate is ammonium hexachloroplatinate.

7. Method according to claim 1, wherein the mixture is heated to 35 to 80° C., optionally while stirring it.

8. Method according to claim 1, wherein the the temperature is kept below 80° C. while adding a reducing agent.

9. Method according to claim 1, wherein the temperature of the resulting reaction mixture is adjusted to 85° C. or higher after adding a reducing agent.

10. Method according to claim 9, wherein the temperature of the resulting reaction mixture is adjusted to be 90° C. or higher after adding the reducing agent, for 1 to 10 hours.

11. Method according to claim 1, which further comprises adding a reducing agent, wherein the reducing agent comprises hydrazine, hydrazine-hydrate, hydrazine hydrohalogenide, ascorbic acid, formic acid, oxalic acid and/or hydroquinone or hydroquinone derivatives and mixtures of said reducing agents.

12. Method according to claim 11, wherein the reducing agent is selected from hydrazine, hydrazine-hydrate, and hydroquinone.

13. Method according to claim 1, wherein the nitrogen-containing hexahalogenoplatinate is produced by converting a solution of a dihydrogen hexahalogenoplatinate in acidic conditions into a nitrogen-containing hexahalogenoplatinate.

14. Method according to claim 1, wherein the nitrogen-containing hexahalogenoplatinate is produced by converting a solution of a dihydrogen hexahalogenoplatinate in the presence of ammonium chloride into ammonium hexahalogenoplatinate.

15. Method according to claim 14, wherein the dihydrogen hexahalogenoplatinate is a dihydrogen hexachloroplatinate that is converted into ammonium hexachloroplatinate in the presence of ammonium chloride, optionally with the ammonium hexachloroplatinate forming a precipitate.

16. Method according to claim 13, wherein the solution of the dihydrogen hexahalogenoplatinate is produced by contacting a dissolved hexahalogenoplatinate to an acidic ion exchanger.

17. Method according to claim 16, wherein the solution of the dihydrogen hexahalogenoplatinate is produced by contacting an alkali hexahalogenoplatinate or an ammonium hexahalogenoplatinate to an acidic ion exchanger.

18. Method according to claim 17, wherein the solution of the dihydrogen hexahalogenoplatinate is produced by contacting a potassium hexahalogenoplatinate or an ammonium hexahalogenoplatinate to an acidic ion exchanger.

19. Method according to claim 1, wherein the platinum sponge is separated, optionally washed, and heat treated at a temperature of 350° C. or higher.

20. Method according to claim 1, comprising the steps:
(i) producing a solution comprising dihydrogen hexachloroplatinate through contacting a dissolved hexachloroplatinate to an acidic ion exchanger;
(ii) producing a nitrogen-containing hexachloroplatinate through converting the dihydrogen hexachloroplatinate solution in acidic conditions into a nitrogen-containing hexachloroplatinate;
(iii) producing a mixture comprising the nitrogen-containing hexachloroplatinate and water, adjusting the pH value of 0 to 4;
(iv) heating the mixture to a temperature of 30° C. or higher;
(v) adding a reducing agent and reducing the mixture at a pH value of 0 to 4;
(vi) precipitating platinum in the form of a platinum sponge;
(vii) separating the platinum sponge, optionally washing the platinum sponge with hydrochloric acid and fully deionised water;
(viii) heat-treating the platinum sponge at a temperature above 350° C.

21. Method according to claim 1, wherein partial steps or the entire method can be implemented in continuous manner.

22. Method according to claim 1, which is feasible to produce 5 kg or more of highly pure platinum/24 hours with the method.

23. Method according to claim 20, wherein the dihydrogen hexachloroplatinate is converted in the presence of ammonium chloride into ammonium hexachloroplatinate forming a precipitate of the nitrogen-containing hexachloroplatinate.

* * * * *

UNITED STATES PATENT AND TRADEMARK OFFICE
CERTIFICATE OF CORRECTION

PATENT NO. : 9,562,275 B2
APPLICATION NO. : 14/196095
DATED : March 4, 2014
INVENTOR(S) : Joachim Kralik et al.

Page 1 of 1

It is certified that error appears in the above-identified patent and that said Letters Patent is hereby corrected as shown below:

Column 11, Line 30, "aa" -- should read -- a --.

Column 12, Line 59, "Cu/NaN" -- should read -- CU/Na/Y --.

Column 22, Line 32, "0to 4" -- should read -- 0 to 4 --.

Signed and Sealed this
Twenty-seventh Day of March, 2018

Andrei Iancu
*Director of the United States Patent and Trademark Office*